(12) United States Patent
Schnur et al.

(10) Patent No.: US 10,919,477 B2
(45) Date of Patent: Feb. 16, 2021

(54) DEPLOYABLE VEHICLE INTERIOR DOOR PANEL

(71) Applicant: Faurecia Interior Systems, Inc., Auburn Hills, MI (US)

(72) Inventors: Brett Schnur, Farmington Hills, MI (US); Maxime Salandre, Rochester, MI (US); Nicholas Natale, Sterling Heights, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 93 days.

(21) Appl. No.: 16/281,797

(22) Filed: Feb. 21, 2019

(65) Prior Publication Data
US 2020/0269796 A1 Aug. 27, 2020

(51) Int. Cl.
| | | |
|---|---|---|
| *B60R 21/04* | (2006.01) | |
| *B60R 21/21* | (2011.01) | |
| *B60R 13/02* | (2006.01) | |
| *B60R 21/02* | (2006.01) | |
| *B60R 21/00* | (2006.01) | |

(52) U.S. Cl.
CPC ...... *B60R 21/0428* (2013.01); *B60R 13/0243* (2013.01); *B60R 21/21* (2013.01); *B60R 2021/0006* (2013.01); *B60R 2021/0273* (2013.01); *B60R 2021/0407* (2013.01)

(58) Field of Classification Search
CPC ........ B60R 13/0243; B60R 2021/0006; B60R 2021/0246; B60R 2021/0273; B60R 2021/0407; B60R 2021/0428; B60R 2021/21512; B60R 2021/2161; B60R 21/21

USPC ....................................................... 296/146.7
See application file for complete search history.

(56) References Cited

U.S. PATENT DOCUMENTS

| | | | |
|---|---|---|---|
| 4,783,114 A | | 11/1988 | Welch |
| 5,482,344 A | * | 1/1996 | Walker ................ B60R 21/0428 280/751 |
| 6,149,224 A | | 11/2000 | Tiberia et al. |
| 6,817,804 B2 | * | 11/2004 | Le Gallo ............... E05F 15/689 403/408.1 |
| 6,955,391 B1 | | 10/2005 | Peng |
| 7,069,696 B2 | * | 7/2006 | Lawrie .................. B29C 65/607 29/897.2 |
| 8,123,276 B2 | | 2/2012 | Subbian et al. |
| 9,233,660 B1 | | 1/2016 | Farooq et al. |
| 2004/0049895 A1 | * | 3/2004 | Draggoo ............... B60R 21/215 24/297 |
| 2004/0052579 A1 | * | 3/2004 | Draggoo ............. B60R 13/0206 403/326 |

(Continued)

FOREIGN PATENT DOCUMENTS

| | | |
|---|---|---|
| EP | 1991446 A1 | 11/2008 |
| FR | 2898312 A1 | 9/2007 |

*Primary Examiner* — Gregory A Blankenship
(74) *Attorney, Agent, or Firm* — Reising Ethington P.C.

(57) ABSTRACT

A door module is equipped with an inflatable bladder configured to move an interior trim panel away from the door and toward a vehicle occupant in the event of a collision. The result is reduced occupant movement, additional absorption of kinetic energy, and distribution of remaining energy over an increased surface area. The bladder can have an accordion-like configuration that unfolds when changing from a deflated state to an inflated state, and more than one bladder can be used to control which portions of the trim panel move relative to each other.

13 Claims, 2 Drawing Sheets

(56) References Cited

U.S. PATENT DOCUMENTS

| | | | |
|---|---|---|---|
| 2005/0161921 A1* | 7/2005 | Higuchi | B60N 2/986 280/735 |
| 2005/0258665 A1* | 11/2005 | Radu | B60J 5/0416 296/146.7 |
| 2006/0033312 A1* | 2/2006 | Barvosa-Carter | B60R 21/04 280/728.1 |
| 2006/0239795 A1* | 10/2006 | Jaconelli | B60R 21/213 411/383 |
| 2007/0052219 A1* | 3/2007 | Rust | B60R 21/0428 280/730.2 |
| 2007/0137004 A1* | 6/2007 | Baekelandt | F16B 5/0657 24/289 |
| 2008/0114516 A1* | 5/2008 | Jackson | B60R 21/0428 701/45 |
| 2008/0164681 A1* | 7/2008 | Nuthalapati | B60R 21/0428 280/734 |
| 2009/0218794 A1* | 9/2009 | Melz | B60R 21/0428 280/730.2 |
| 2010/0000156 A1* | 1/2010 | Salhoff | B60J 5/0416 49/502 |
| 2010/0019474 A1* | 1/2010 | Kaneda | B60R 13/0243 280/730.2 |
| 2013/0033023 A1* | 2/2013 | Rick | B60R 21/213 280/731 |
| 2013/0062867 A1* | 3/2013 | Schmitz | B60Q 3/217 280/734 |
| 2016/0009246 A1* | 1/2016 | Ryan | B60R 21/21 280/730.2 |
| 2016/0031400 A1* | 2/2016 | Ruthinowski | B60R 21/2338 280/743.1 |
| 2017/0159328 A1* | 6/2017 | Roychoudhury | E05C 9/04 |
| 2019/0366970 A1* | 12/2019 | Wiscombe | B60R 21/23138 |
| 2020/0039462 A1* | 2/2020 | Jindal | B60R 21/21 |
| 2020/0172041 A1* | 6/2020 | Dix | B60R 19/40 |

* cited by examiner

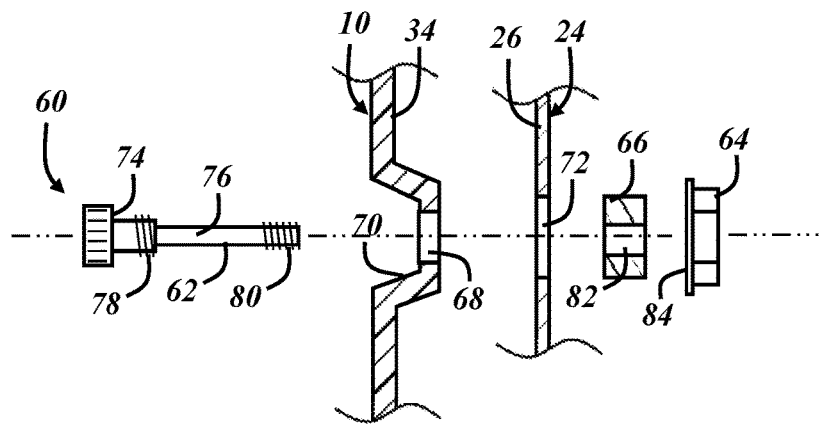
FIG. 4
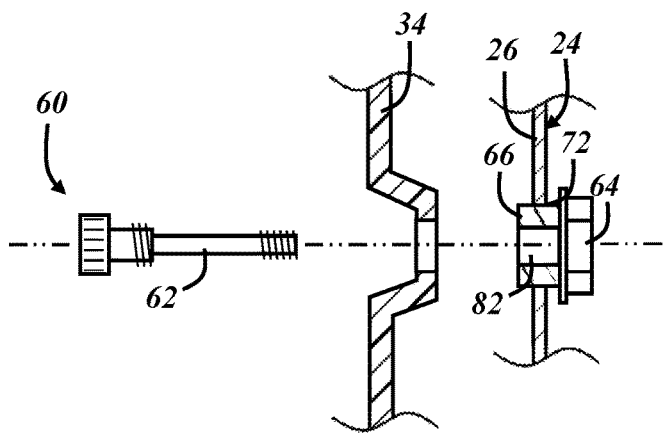
FIG. 5
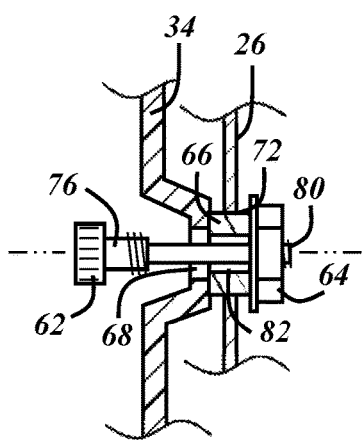 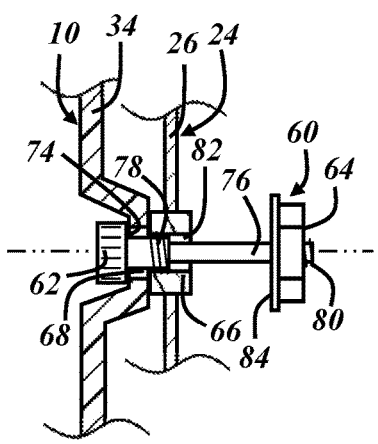 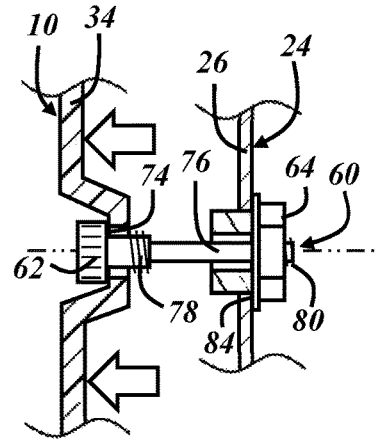
FIG. 6  FIG. 7  FIG. 8

DEPLOYABLE VEHICLE INTERIOR DOOR PANEL

TECHNICAL FIELD

The present disclosure is related generally to vehicle safety systems and, more particularly, to deployable components in vehicle interiors for enhancing occupant safety during a collision.

BACKGROUND

Vehicle door assemblies are one area of focus for safety features intended to help reduce or prevent injuries to vehicle occupants in the event of a collision. Vehicle door assemblies have been proposed to include energy absorbing crash safety cones, crushable energy absorbing blocks, door-mounted airbags, and metal reinforcing beams to help achieve this object. But side-impact collisions, in which the front of a moving vehicle collides with a door of another vehicle, represent situations in which the occupant of the vehicle being hit in the door is relatively close to the crash energy source when compared to front or rear collisions where the length of the vehicle provides more crash energy absorption capability. Protecting vehicle occupants along the sides of the vehicle thus presents a greater safety challenge.

One example of a side-impact safety feature is disclosed in U.S. Pat. No. 9,233,660 to Farooq et al., which discloses a vehicle door assembly with a moveable armrest. During normal use, the armrest is positioned adjacent the torso of the vehicle occupant. In the event of a side impact, the armrest moves downward toward the hip region of the vehicle occupant. The purported benefit is prevention of the armrest from impacting the ribs of the vehicle occupant during the collision. Unfortunately, the Farooq structure does nothing to limit occupant movement toward the vehicle door and, thus, toward the vehicle that is impacting the door.

SUMMARY

An illustrative vehicle door module for attachment to an interior side of a vehicle door includes a trim panel and an inflatable bladder. The trim panel has a decorative side that faces an interior of a passenger cabin of a vehicle when the door module is attached to the vehicle door, and the inflatable bladder is on a back side of the trim panel opposite the decorative side. The bladder has a deflated state and is configured to change to an inflated state in the event of a collision. The inflatable bladder forces the trim panel away from the vehicle door when the bladder changes to the inflated state.

In one or more embodiments, the inflatable bladder has an inner side facing toward the trim panel, an opposite outer side facing toward the vehicle door, and an expandable side wall extending between the inner and outer sides.

In one or more embodiments, an expandable side wall unfolds when the inflatable bladder changes to the inflated state.

In one or more embodiments, the inflatable bladder is a first inflatable bladder located along a forward portion of the door module, and the door module also includes a second inflatable bladder on the back side of the trim panel located along a rearward portion of the door module.

In one or more embodiments, first and second inflatable bladders are separately inflatable so that one or both of respective forward and rearward portions of the trim panel can be forced away from the vehicle door when the corresponding inflatable bladder changes to the inflated state.

In one or more embodiments, the door module is attached to the vehicle door via a fastener configured to move away from the vehicle door with the trim panel when the bladder changes to the inflated state.

In one or more embodiments, the door module is attached to the vehicle door via a fastening system having a first shoulder in contact with the decorative side of the trim panel and a shaft extending to a second shoulder that faces toward the first shoulder. The second shoulder is in an unloaded condition when the inflatable bladder is in the deflated state and in a loaded condition when the inflatable bladder changes to the inflated state.

In one or more embodiments, a first shoulder of a fastening system is in a loaded condition to hold the door module to the vehicle door when the bladder is in the deflated state, and a second shoulder prevents the trim panel from detaching from the vehicle door when the bladder changes to the inflated state.

In one or more embodiments, the door module is attached to the vehicle door via a threaded fastener having a first threaded portion and a second threaded portion axially spaced from the first threaded portion. The first threaded portion is loaded to hold the door module to the vehicle door when the bladder is in the deflated state. The second threaded portion is in an unloaded condition when the bladder is in the deflated state and in a loaded condition when the bladder changes to the inflated state.

In one or more embodiments, a first threaded portion of a threaded fastener is in threaded engagement with an attachment portion of the vehicle door when the door module is attached to the vehicle door and the bladder is in the deflated state. The threaded engagement is configured to break when the bladder changes to the inflated state.

In one or more embodiments, an attachment portion of the vehicle door includes a plastic sleeve into which the first threaded portion fits to form the threaded engagement.

In one or more embodiments, the inflatable bladder is configured to deflate after changing to the inflated state.

In one or more embodiments, the inflatable bladder includes an upper segment along a top portion of the trim panel, a lower segment along a bottom portion of the trim panel, and a side segment interconnecting the upper and lower segments.

In one or more embodiments, the inflatable bladder is one of a pair of U-shaped bladders on the back side of the trim panel with the open end of the U-shapes facing each other.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein:

FIG. 4 is an exploded and partial cross-sectional view of a fastening system for attaching the door module to the vehicle door;

FIG. 5 is the view of FIG. 4 with an insert and nut installed in the vehicle door;

FIG. 6 is the view of FIG. 5 with a bolt engaging the nut;

FIG. 7 is the view of FIG. 6 with the bolt engaging the insert and detaching the nut from the insert; and FIG. 8 is the view of FIG. 7 when the bladder changes to the inflated state.

DESCRIPTION OF ILLUSTRATIVE EMBODIMENTS

Described below is a door module configured to help limit movement of the vehicle occupant toward the vehicle door during a collision. It has been realized that the space between a seated vehicle occupant and the inside surface of the adjacent vehicle door has been neglected in the prior art as a space which can be exploited in favor of occupant safety. In particular, that space can be reduced in a controlled manner when a collision occurs. Moreover, that space can be reduced by something other than the intruding vehicle that is colliding into the door from the outside, resulting in reduced occupant movement, additional absorption of kinetic energy, and distribution of remaining energy over an increased surface area.

Figure 1:
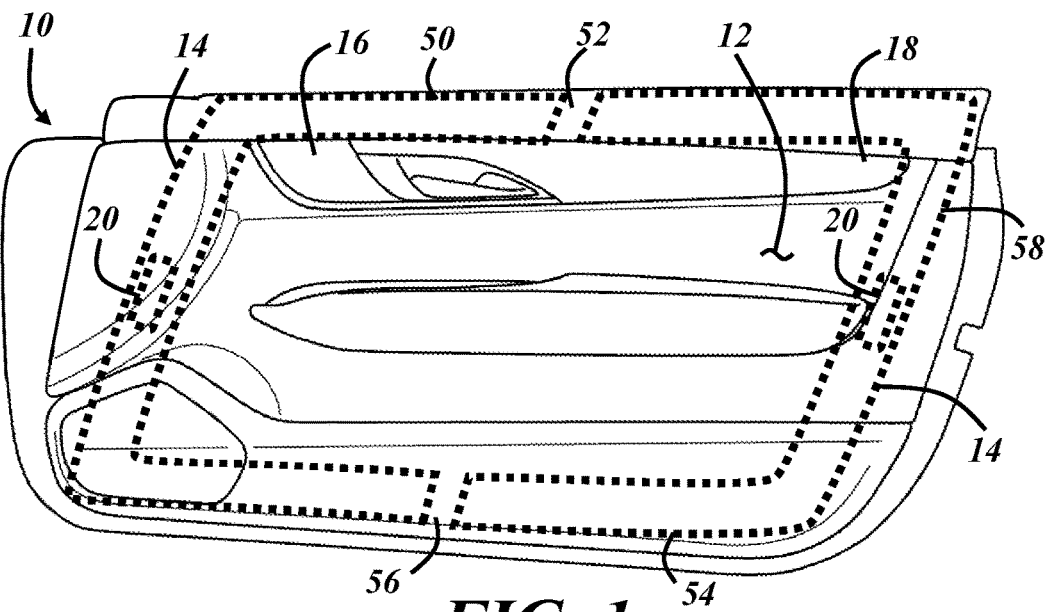
FIG. 1 is view of a decorative side of a vehicle door module equipped with a pair of inflatable bladders along an opposite side of the module.

FIG. 1 is an exemplary door module 10 configured for attachment to an interior side of a vehicle door. The door module 10 is viewed from an inner side 12 that faces a passenger cabin of the vehicle when attached to the vehicle door and when the door is in a closed position. The door module 10 includes one or more inflatable bladders 14 along its outer or back side. In this example, the module 10 includes a pair of inflatable bladders 14, which are depicted in broken lines in FIG. 1. Each illustrated bladder 14 has a U-shaped configuration with the open ends of the U-shapes facing each other. One of the bladders 14 is located along a forward portion 16 of the module 10, and the other is located along a rearward portion 18 of the module. The door module 10 also includes inflators 20 configured to rapidly change the respective bladders 14 from a deflated state to an inflated state in the event of a collision. Each inflator 20 may be or may include a gas cartridge, such as a carbon dioxide ($CO_2$) canister, that can be activated by a signal from another vehicle safety system component, such as a crash sensor or a related controller, to inflate the bladder 14 to which it is operably attached. Each inflator 20 may be located between one of the bladders 14 and the remainder of the door module 10 or elsewhere in the door module.

Figure 2:
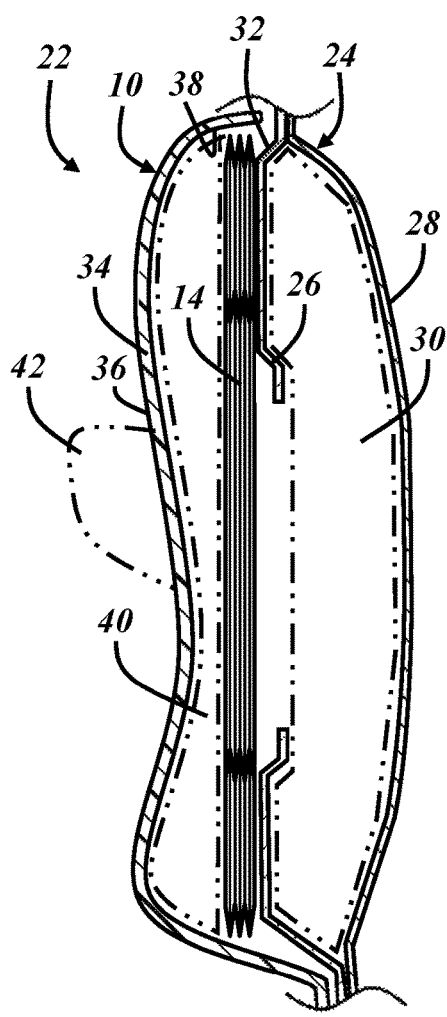
FIG. 2 is a representative cross-sectional view of the bladder-equipped door module attached to a vehicle door.

FIG. 2 is a representative cross-sectional view of a vehicle door assembly 22 that includes the bladder-equipped door module 10. The door assembly 22 includes a vehicle door 24 and the door module 10. The vehicle door 24 includes a framework 26 and an exterior panel 28. The framework 26 is the underlying structure of the door assembly 22 to which other door assembly components are ultimately attached and which provides attachment points (e.g., hinges) to the vehicle body. The framework 26 is typically a stamped metal (e.g., steel) component but may be formed from any sufficiently strong and rigid material. The exterior panel 28 is attached to the framework 26 and provides the exterior shape and a portion of the aesthetic appearance of the vehicle exterior. A cavity 30 formed between the framework 26 and the exterior panel 28 is depicted in phantom view in FIG. 2. This cavity 30 may house various other door assembly components not explicitly shown here, such as window glass and regulators, reinforcing beams, a door latch mechanism, and linkages between the latch mechanism and an exterior door handle, for example.

The door module 10 is attached or configured for attachment to an interior side 32 of the vehicle door 24 or, specifically, to the framework 26 of the door. The door module 10 includes an interior trim panel 34 and the inflatable bladder or bladders 14. The trim panel 34 has a decorative side 36 that faces an interior of the vehicle passenger cabin when in use. The trim panel 34 may have a multi-layer construction, including, for example, a plastic or other suitable substrate, a decorative layer (e.g., leather, simulated leather and/or fabric) disposed over the substrate to face the vehicle interior, and one or more interlayers such as foam or spacer fabric. The bladder 14 is located along a back side 38 of the trim panel 34, opposite the decorative side 36. A packaging envelope 40 between the trim panel 34 and the bladder 14 is depicted in phantom view. This envelope 40 may house various other door module or door assembly components not explicitly shown here, such as an audio system speaker, wire harnesses, window control switches, an inside door handle mechanism, and/or the bladder inflators 20, to list a few examples. An interior armrest 42 is also illustrated in phantom view.

Figure 3:
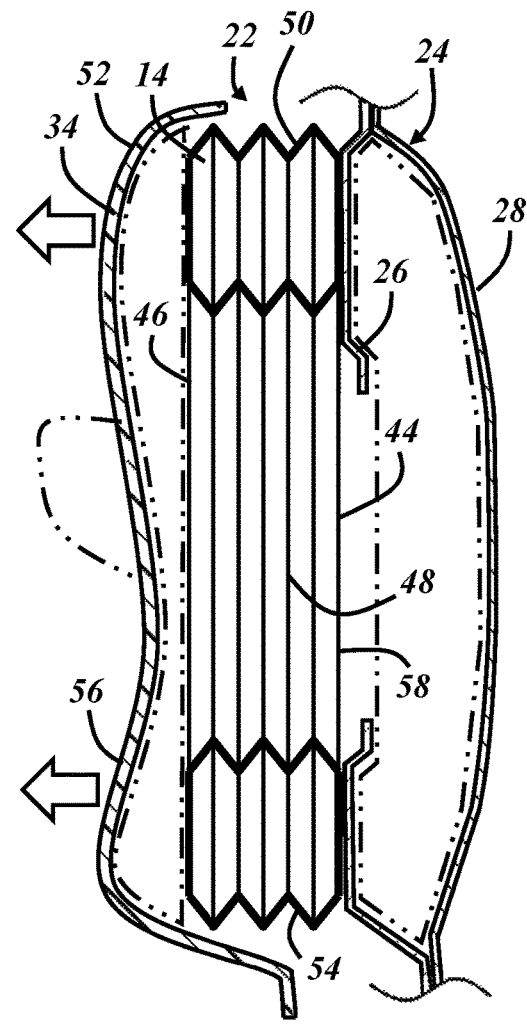
FIG. 3 is the cross-sectional view of FIG. 2 with the inflatable bladder changed to an inflated state.

FIG. 2 illustrates the inflatable bladder 14 in a deflated state, which is its normal use state from the time the door module 10 and vehicle are manufactured until the vehicle experiences a collision that necessitates inflation of the bladder. The bladder 14 is configured to change to an inflated state in the event of a collision. As shown in FIG. 3, the bladder 14 forces the trim panel 34 away from the vehicle door 24, and thus toward the vehicle seat occupant, when the bladder changes from the deflated state of FIG. 2 to the inflated state of FIG. 3. Other vehicle safety system components, such as accelerometers, crash sensors, and/or controllers, may determine when inflation of the bladder 14 is warranted and trigger such inflation via a signal sent to the appropriate inflator. The trim panel 34, which defines the inside surface of the door assembly 22 closest to the vehicle occupant, can thereby be relocated at the beginning of the crash event in a manner that prevents the occupant from moving toward the vehicle door and possibly from moving toward the vehicle or other object that is colliding with the exterior of the door.

As a result, less of the crash energy is absorbed by the vehicle occupant, and more of the crash energy is absorbed by the vehicle structure and other safety features, such as the framework 26, exterior panel 28, and internal beam of the door, all of which now have farther to move and deform before reaching the vehicle occupant. The bladder-equipped door module 10 can work in conjunction with a side curtain airbag, which may be designed to prevent the head and shoulder area of the occupant from impacting the vehicle framework (e.g., B-pillar). The door module 10 or vehicle door 24 may include additional energy-absorbing features, such as foam blocks or crash cones. The bladder 14 may also be vented in the manner of an airbag so that it can begin deflating in a controlled manner immediately after changing to the inflated state. Such controlled deflation effectively absorbs additional kinetic energy from the collision rather than transferring that energy to the occupant.

The dual-bladder example of FIG. 1 can provide independent and timed control of inflation of the separate bladders 14. When a side-impact collision is detected, for example, both of the bladders 14 can be changed to the inflated state simultaneously to move the entire trim panel 34 away from the exterior of the door and toward the occupant for maximum reduction of occupant movement toward the collision impact location. When a front or frontal offset collision is detected, it is possible to inflate only the bladder behind the forward portion of the trim panel while allowing the bladder behind the rearward portion of the trim panel to remain in the deflated state so that the trim panel 34 is angled away from the vehicle door. Or inflation of the rearmost bladder may be delayed with respect to inflation of the forward-most bladder. There may also be situations in which only the rearmost bladder should be inflated.

With reference to FIG. 3, the illustrated inflatable bladder 14 has a bellows or accordion-like structure, including an inner side 44 facing toward the trim panel 34, an opposite outer side 46 facing toward the vehicle door 24, and an expandable side wall 48 extending between the inner and outer sides. The side wall 48 is expandable in the sense that it unfolds during bladder inflation to effectively increase the distance between the inner and outer sides 44, 46 without substantially changing dimensions of the bladder in other directions, such as the vertical and longitudinal directions of the vehicle. In one embodiment, the bladder 14 is injection molded in the expanded configuration of FIG. 3 with the side wall 48 then collapsed for assembly to the door module. A thermoplastic elastomer (TPE) is one suitable material from which the bladder 14 can be formed. The inflatable bladder 14 can take other non-accordion-like forms that force the trim panel 34 away from the door 24 when inflated.

In one manner of construction, the trim panel 34 is first provided, and various other door module components such as those noted above are affixed to the back side 38 of the trim panel within the packaging envelope 40. The $CO_2$ canisters or other inflators 20 are then affixed to the back side 38 of the trim panel 34, followed by the inflatable bladders 14. Alternatively, the bladders 14 are located between the trim panel 34 and the inflators 20. In the illustrated example, each bladder 14 includes an upper segment 50 located along a top portion 52 of the trim panel, a lower segment 54 located along a bottom portion 56 of the trim panel, and a side segment 58 interconnecting the upper and lower segments to form the U-shape illustrated in FIG. 1. This configuration is non-limiting. Any number of bladders 14 can be used in any shape, size, or orientation, and each bladder can be separately and independently inflated for controllable movement and controllable timing of movement of different portions of the trim panel 34 away from the vehicle door 24 during a collision.

The bladder-equipped door module 10 can be installed onto the vehicle door 24 with locating-type fasteners, such as birds-beak push pins and/or clips along the top portion 52 (e.g., the roll area) of the trim panel 34, for example. These locating fasteners are intended to hold the door module 10 in place for subsequent installation of more permanent fasteners that hold the door module to the vehicle door 24 for the life of the vehicle. As illustrated in FIGS. 4-8, these more permanent fasteners may be part of a fastening system having two distinct functions: 1) securely holding the door module 10 to the vehicle door 24 during normal vehicle operation for the life of the vehicle, and 2) permitting the trim panel 34 to be forced away from the vehicle door when the bladder 14 inflates during a collision.

FIG. 4 is an exploded and partial cross-sectional view of a portion the door module 10, a portion of the vehicle door 24 to which the door module is configured for attachment, and an exemplary fastening system 60, which includes a bolt 62, a nut 64, and an insert 66. In particular, FIG.4 shows a portion of the trim panel 34 of the door module 10 and a portion of the framework 26 of the vehicle door 24. The trim panel 34 includes an attachment opening 68 and a recess 70 to accommodate the bolt 62. The framework 26 includes an attachment opening 72 that accommodates the bolt 62 and the insert 66.

The bolt 62 is a threaded fastener with a shoulder 74, a shaft 76 extending away from the shoulder, a first threaded portion 78, and a second threaded portion 80. The second threaded portion 80 is located at an end of the shaft opposite the shoulder end of the shaft. The first threaded portion 78 has a larger diameter than the second threaded portion 80. The shoulder 74 is sized larger than the attachment opening 68 in the panel 34 to facilitate clamping of the panel 34 to the door 24. The first and second threaded portions 78, 80 are both sized to pass through the attachment opening 68 of the panel 34. The second threaded portion 80 is sized to pass through the insert 66 and configured for threaded engagement with threads of the nut 64.

The insert 66 is sized for a press fit in the attachment opening 72 of the framework 26. An attachment opening 82 in the insert 66 is sized to allow the second threaded portion 80 of the bolt 62 to pass through the insert and to form a threaded engagement with the first threaded portion 78 of the bolt 62. In one embodiment, the insert is plastic (e.g., nylon, acetal, etc.) and the first threaded portion 78 is self-tapping. The insert 66 may be made from other materials, pre-threaded, and/or the first threaded portion 78 may form a threaded engagement with the attachment opening 72 of the framework 26. The threaded engagement formed with the first threaded portion 78 of the bolt 62 is intentionally configured to be weaker than the threaded engagement formed between the second threaded portion 80 and the nut 64 as described further below.

The nut 64 has a shoulder 84 that faces the shoulder 72 of the bolt 62 when engaged with the bolt. The shoulder 84 of the nut 64 is sized larger than the attachment opening 72 so that the nut cannot pass therethrough. Both the bolt 62 and the nut 64 may be made from a metal (e.g., steel) or other suitably strong material to perform the functions discussed below.

FIG. 5 illustrates the fastening system 60 during one stage of assembly. Here, the insert 66 and the nut 64 are shown attached to the framework 26 of the vehicle door 24 before the bolt 62 is added. The insert 66 may be pressed into the attachment opening 72 of the framework 26 or otherwise attached to the vehicle door. While the exploded view of FIG. 4 shows the insert 66 on the outboard side of the framework 26, the insert could alternatively be attached along the inboard side of the framework. The nut 64 is attached to the insert 66 so that the threaded opening of the nut 64 is concentric with the attachment opening 72 of the framework 26 and the opening 82 in the insert 66. The nut 64 and the insert 66 may be adhesively attached together in this configuration with the nut located on the outboard side of the framework 26—i.e., on the opposite side of the framework from the panel 34. Non-adhesive attachment is also possible (e.g., pins, light press fit, etc.), but the attachment between the nut 64 and insert 66 should be sufficiently weak to become detached once the bolt 62 is threaded into the nut 64.

FIG. 6 illustrates a subsequent stage of assembly in which the panel 34 is placed adjacent the framework 26 with the attachment openings 68, 72, 82 aligned and the bolt 62 inserted therethrough. In particular, the portion of the shaft 76 of the bolt 62 including the smaller threaded portion 80 is passed through the opening 68 of the panel 34 and through the opening 82 of the insert 66 to engage the nut 64. The bolt 62 forms a threaded engagement with the nut 64 as the bolt is turned. When the end of the threaded portion 80 is reached such that the bolt 62 can no longer turn without breaking the nut 64 free from the insert 66, the bolt is turned farther to free the nut from the insert. The bolt 62 and attached nut 64 are now free to move farther in the outboard direction of the door.

FIG. 7 illustrates a subsequent stage of assembly in which the first threaded portion 78 of the bolt forms a threaded engagement with the insert 66. In particular, the shaft 76 of the bolt 62 is moved farther through the attachment openings 68, 82 until the first threaded portion 78 engages the attachment opening 82 of the insert 66. Additional turning of the bolt 62 forms the threaded engagement with the insert 66 and clamps the panel 34 against the framework 26 and/or the insert. This is the normal use condition for the illustrated fastening system 60 for the life of the vehicle until and if there is a collision that causes the above-described bladder to be inflated. In this condition, the shoulder 74 and the first threaded portion 78 of the bolt 62 are in a loaded condition, holding the panel 34 and the door module 10 securely to the door 24.

The shoulder 84 of the nut 64 and the second threaded portion 80 of the bolt 62, on the other hand, are in a no-load condition in FIG. 7, with the nut positioned in the cavity 30 between the framework 26 and the exterior panel 28 of the door 24 (see FIG. 2). In fact, the nut 64 may spend its entire service life in a this no-load condition if the vehicle in which it is installed is never in a collision that inflates the above-described bladder. However, in the event of a collision, the threaded engagement between the nut 64 and the bolt 62 is what prevents the door module 10 from detaching from the vehicle door 24 when the bladder inflates during a collision.

As shown in FIG. 8, when the bladder changes to the inflated state and forces the panel 34 and the rest of the module 10 away from the door 24 and toward the vehicle occupant, the fastening system 60 acts to permit this relative movement while also limiting the same movement. The moving trim panel 34 pulls the bolt 62 via the shoulder 74 of the bolt, thereby pulling the attached nut 64 with it. The bolt 62 and nut 64 thus move together with the panel 34 during bladder inflation. When the nut 64 encounters the framework 26, movement of the bolt 62 is abruptly stopped, which also halts the movement of the panel 34.

The bolt 62 may be referred to as a travel bolt, because it travels from one location to another during bladder inflation. The bolt 62 also permits the panel 34 to travel away from the door 24 and defines the amount of travel of the panel away from the door by limiting the allowable travel via the dimensions of the shaft and threaded portions of the bolt. For instance, the total amount of travel of the panel 34 that is permitted is defined by the axial distance between the shoulder 74 of the bolt 62 and the position of the shoulder or face 84 of the nut 64 when the nut and bolt are tightened together. The position of the nut 64 along the shaft 76 of the bolt 62 is defined by the position of the second threaded portion 80 of the bolt along the shaft.

In order for the travelling bolt system to operate properly, the threaded engagement formed with the first threaded portion 78 of the bolt should be configured to break at a force lower than the force applied to the trim panel 34 by the inflating bladder. Where a plurality of travelling bolts are used at different locations along the door module 10, the force required to break the threaded engagement should be only a fraction of the force applied to the trim panel by the inflating bladder since the force will be distributed among multiple fasteners. Parameters that affect the breaking force of the threaded engagement include the strength of the joined materials and the thread configuration. For example, threaded engagement with a weaker plastic insert (e.g., polyethylene) will break at a lower force than with a metal or a stronger plastic insert (e.g., reinforced nylon), with other parameters being the same. Also, a loose threaded engagement or a smaller number of engaged threads will break at a lower force than with a tight threaded engagement or a higher number of engaged threads.

It is noted that the fastening system is in no way limited to the use of threaded fasteners and/or plastic inserts. Skilled artisans in possession of this disclosure may devise other fastening configurations that permit the trim panel to be securely held in place on the vehicle door during normal vehicle use and to break away from the door when the inflatable bladder of the door module inflates. For example, wire tethers could be used to limit panel movement with some other type of frangible fastener holding the panel to the door during normal use.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle door module for attachment to an interior side of a vehicle door, the door module comprising:
   a trim panel having a decorative side that faces an interior of a passenger cabin of a vehicle when the door module is attached to the vehicle door; and
   an inflatable bladder on a back side of the trim panel opposite the decorative side, the bladder having a deflated state and being configured to change to an inflated state in the event of a collision,
   wherein the inflatable bladder forces the trim panel away from the vehicle door when the bladder changes to the inflated state, and
   wherein the door module is attached to the vehicle door via a fastener having opposite first and second ends configured to move together with the trim panel in a direction away from the vehicle door when the bladder changes to the inflated state.

2. The door module of claim 1, wherein the inflatable bladder has an inner side facing toward the trim panel, an opposite outer side facing toward the vehicle door, and an expandable side wall extending between the inner and outer sides.

3. The door module of claim 2, wherein the expandable side wall unfolds when the inflatable bladder changes to the inflated state.

4. The door module of claim 1, wherein the inflatable bladder is a first inflatable bladder located along a forward portion of the door module, the door module further comprising a second inflatable bladder on the back side of the trim panel located along a rearward portion of the door module.

5. The door module of claim 4, wherein the first and second inflatable bladders are separately inflatable so that one or both of respective forward and rearward portions of the trim panel can be forced away from the vehicle door when the corresponding inflatable bladder changes to the inflated state.

6. The door module of claim 1, wherein the inflatable bladder is configured to deflate after changing to the inflated state.

7. The door module of claim 1, wherein the inflatable bladder includes an upper segment along a top portion of the trim panel, a lower segment along a bottom portion of the trim panel, and a side segment interconnecting the upper and lower segments.

8. The door module of claim 7, wherein the inflatable bladder is one of a pair of U-shaped bladders on the back side of the trim panel with the open end of the U-shapes facing each other.

9. A vehicle door module for attachment to an interior side of a vehicle door, the door module comprising:
   a trim panel having a decorative side that faces an interior of a passenger cabin of a vehicle when the door module is attached to the vehicle door; and
   an inflatable bladder on a back side of the trim panel opposite the decorative side, the bladder having a deflated state and being configured to change to an inflated state in the event of a collision,
   wherein the inflatable bladder forces the trim panel away from the vehicle door when the bladder changes to the inflated state, and
   wherein the door module is attached to the vehicle door via a fastening system having a first shoulder in contact with the decorative side of the trim panel and a shaft extending to a second shoulder that faces toward the first shoulder, the second shoulder being in an unloaded condition when the inflatable bladder is in the deflated state and in a loaded condition when the inflatable bladder changes to the inflated state.

10. The door module of claim 9, wherein the first shoulder is in a loaded condition to hold the door module to the vehicle door when the bladder is in the deflated state, and
    wherein the second shoulder prevents the trim panel from detaching from the vehicle door when the bladder changes to the inflated state.

11. A vehicle door module for attachment to an interior side of a vehicle door, the door module comprising:
    a trim panel having a decorative side that faces an interior of a passenger cabin of a vehicle when the door module is attached to the vehicle door; and
    an inflatable bladder on a back side of the trim panel opposite the decorative side, the bladder having a deflated state and being configured to change to an inflated state in the event of a collision,
    wherein the inflatable bladder forces the trim panel away from the vehicle door when the bladder changes to the inflated state,
    wherein the door module is attached to the vehicle door via a threaded fastener having a first threaded portion and a second threaded portion axially spaced from the first threaded portion, the first threaded portion being loaded to hold the door module to the vehicle door when the bladder is in the deflated state, and
    wherein the second threaded portion is in an unloaded condition when the bladder is in the deflated state and in a loaded condition with the bladder changes to the inflated state.

12. The door module of claim 11, wherein the first threaded portion is in threaded engagement with an attachment portion of the vehicle door when the door module is attached to the vehicle door and the bladder is in the deflated state, said threaded engagement being configured to break when the bladder changes to the inflated state.

13. The door module of claim 12, wherein the attachment portion comprises a plastic sleeve into which the first threaded portion fits to form the threaded engagement.

* * * * *